United States Patent [19]

Dychdala et al.

[11] 3,793,216

[45] Feb. 19, 1974

[54] CALCIUM HYPOCHLORITE COMPOSITION

[75] Inventors: George Roman Dychdala, Norristown; Robert Sloane Custer, Radnor, both of Pa.

[73] Assignee: Pennwalt Corporation, Philadelphia, Pa.

[22] Filed: Dec. 6, 1971

[21] Appl. No.: 205,286

[52] U.S. Cl............... 252/187 H, 252/95, 252/99, 423/474, 424/149
[51] Int. Cl............................................ C01b 11/06
[58] Field of Search .... 252/187 H, 99, 95; 423/474; 424/149

[56] References Cited
UNITED STATES PATENTS

| | | | |
|---|---|---|---|
| 2,977,314 | 3/1961 | Stephanou | 252/187 H |
| 3,544,267 | 12/1970 | Dychdala | 252/187 H |
| 2,901,435 | 8/1959 | Robson | 252/187 H |
| 2,963,440 | 12/1960 | Robson | 252/187 H |
| 3,560,396 | 2/1971 | Robson | 252/187 H |
| 3,669,894 | 6/1972 | Faust | 252/187 H |

*Primary Examiner*—Mayer Weinblatt
*Assistant Examiner*—Irwin Gluck

[57] ABSTRACT

A calcium hypochlorite composition, containing at least about 55 percent $Ca(OCl)_2$ and which is resistant to exothermic, self-propagating decomposition, consists essentially of calcium hypochlorite uniformly mixed with water-soluble, hydrated inorganic salt in an amount sufficient to provide a water content in the total mixture in the range of about 3 percent to about 13 percent.

3 Claims, No Drawings

CALCIUM HYPOCHLORITE COMPOSITION

This invention relates to an improved high-grade calcium hypochlorite composition that is resistant to exothermic, self-propagating decomposition caused by spark, flame or contamination with an organic substance. More particularly, this invention concerns a calcium hypochlorite composition containing at least about 55 percent $Ca(OCl)_2$, preferably about 60 to 70 percent $Ca(OCl)_2$, on a total weight basis, consisting essentially of particulate calcium hypochlorite uniformly mixed with water-soluble, hydrated inorganic salt in quantity sufficient to provide a water content in said mixture within the range of about 3 percent to about 13 percent by weight.

High-grade particulate calcium hypochlorite compositions are primarily used for water treatment, especially of swimming pools, where it serves as a convenient source of chlorine for disinfectant purposes and for general sanitation. Several commercial processes are currently used for the manufacture of the so called "high-grade" calcium hypochlorite compositions containing at least about 65 percent $Ca(OCl)_2$, from which the active and available chlorine for sanitation purposes is derived.

In one process, lime in aqueous slurry, or a mixture of lime and dibasic calcium hypochlorite $[Ca(OCl)_2 \cdot 2Ca(OH)_2]$, is chlorinated to produce a solution of calcium hypochlorite. The liquor is clarified to exclude the lime impurities and then treated with an alkali metal salt to salt out (precipitate) crystals of neutral calcium hypochlorite dihydrate $[Ca(OCl)_2 \cdot 2H_2O]$. In another process, a slurry of hydrated lime and caustic soda is chlorinated and subsequently cooled to −10°F. The crystals which form are centrifuged to remove the mother liquor and most of the insoluble impurities. The mixture is warmed to precipitate crystals of neutral calcium hypochlorite dihydrate, leaving most of the sodium chloride in solution in a product slurry ready for separation. In another process, crystals of dibasic calcium hypochlorite in aqueous suspension are chlorinated to obtain a slurry of neutral calcium hypochlorite dihydrate in a mother liquor of reduced calcium chloride content. In yet another process, heavy lime slurry is chlorinated at 40°–45°C. forming large crystals of hemibasic calcium hypochlorite $[Ca(OCl)_2 \cdot \frac{1}{2}Ca(OH)_2]$. The hemibasic crystals are suspended in a thin lime slurry and chlorinated, resulting in the formation of a slurry of laminar crystals of neutral calcium hypochlorite dihydrate.

In the product recovery step of all of the foregoing and similar processes and their several modifications, crystals of neutral calcium hypochlorite dihydrate containing various salt impurities are separated from the aqueous mother liquors by filtration or centrifugation of the slurry. The wet cake is dried in air driers at from about 180°F. to 200°F., normally producing a substantially anhydrous product which contains less than 1 percent by weight of water.

In another commercial process of manufacture, a moist gaseous mixture of carbon dioxide and air containing about 10 percent chlorine is passed through a rotating tube against a flow of soda ash, part of which is converted to bicarbonate. The exit gas formed from the reaction, containing a few percent chlorine monoxide, is passed through cold water to form a solution of hypochlorous acid. This aqueous solution is carefully neutralized with hydrated lime and spray-dried to yield an intermediate calcium hypochlorite product which is densified and dried to a water content of below 1 percent.

Chemically, the above-described commercial calcium hypochlorite products contain on the order of at least about 65 percent, normally about 70–78 percent, and in some cases up to about 85 percent or more by weight of $Ca(OCl)_2$, the remaining constituents being sodium chloride, calcium chlorate, calcium hydroxide, calcium carbonate and calcium chloride. However, the products are always nominally referred to in the trade as "calcium hypochlorite." A typical product will have the following approximate chemical analysis on a dry weight basis.

|  | Percent by weight |
| --- | --- |
| Calcium hypochlorite | 74 |
| Calcium chlorate | 1.5 |
| Calcium hydroxide | 3 or less |
| Calcium chloride | 2 or less |
| Calcium carbonate | 2 |
| Sodium chloride | 17.5 |

As discussed above, it has generally been the practice in the industry to provide a calcium hypochlorite composition which has been thoroughly dried so as to contain less than 1 percent water. The major disadvantage of this essentially water-free composition is the danger attendant thereto if contacted by external contaminants, which contamination causes exothermic decomposition of the material regardless of the temperature. For example, if any portion of a batch of said calcium hypochlorite, whether in a small container, large drum or uncontained mass, reaches a temperature of about 350°F., it will undergo a self-sustaining and self-propagating decomposition which will spread through the entire batch until decomposition is complete. The decomposition may be initiated by the accidental touching of a live flame or spark to the calcium hypochlorite, as for example, the accidental contact of a lit match or cigarette thereto. Decomposition may also be initiated by contacting the hypochlorite with just a single drop of organic material, for example, glycerine, an alcohol, a variety of hydrocarbons such as petroleum oil, and many others. The decomposition evolves gaseous chlorine which constitutes a toxic hazard to personnel in the area, and also evolves oxygen which intensifies a fire that might reach stored quantities of calcium hypochlorite.

Another disadvantage of the above described substantially dry products is that although the compositions are largely comprised of granules, there is present in these products a significant amount, e.g., from about 0.1 to about 2 percent, of undesired dusty fines having a particle size range such that they pass through a 200 mesh screen (Tyler Screen Scale) and usually through a 325 mesh screen. These small, dust-like particles are easily air-borne and account for some lost production during manufacture and packaging and, in addition, create a nuisance and dangerous irritant to the plant worker and ultimate consumer. Another characteristic assigned by those skilled in the art to the foregoing substantially water-free calcium hypochlorite products is that the storage stability, i.e., retention of available chlorine content during protracted periods of storage, is inversely proportional to the water content. Said products normally lose from 1 to about 4 percent of their available chlorine content per year in storage.

Dychdala, U.S. Pat. No. 3,544,267, Dec. 1, 1970, describes one successful technique of solving the foregoing problems by a method which comprises uniformly contacting a substantially dry, particulate calcium hypochlorite composition with a spray or mist of a measured amount of water while agitating said composition, to prepare a free-flowing, dust-free, granular, calcium hypochlorite composition resistant to exothermic, self-propagating decomposition when contacted by flame, spark or a contaminating organic substance. The present invention provides another technique for obtaining a "safe" calcium hypochlorite composition, involving a relatively simple and economical operation of uniformly mixing particulate solid materials, using such conventional solids-mixing apparatus as a ribbon blender, a twin-cone blender, a sigma-blade mixer, a roller-type blender and the like.

The composition of this invention is a calcium hypochlorite composition containing at least about 55 percent $Ca(OCl)_2$, and preferably at least about 60 to 70 percent $Ca(OCl)_2$, on a total weight basis, consisting essentially of particulate calcium hypochlorite, as described hereinabove, uniformly mixed with water-soluble, hydrated inorganic salt in quantity sufficient to provide a water content in said mixture within the range of about 3% to about 13%, preferably within the range of about 5 to 10 percent, by weight of the mixture.

The term "hydrated inorganic salt" as used herein has its conventional meaning, that is, the substance resulting from the reaction of an acid with a base and which will crystallize from aqueous solution with a specific amount of water molecularly bound up in the salt crystal as water of hydration. Representative of the hydrated inorganic salts operable in the present compositions are the various hydrated alkali metal and alkaline earth metal phosphates, silicates, borates, carbonates and sulfates, including mixed salts, for example, sodium tetraborate pentahydrate, sodium tetraborate octahydrate, sodium tetraborate decahydrate, lithium chloride monohydrate, sodium tripolyphosphate hexahydrate, magnesium sulfate heptahydrate, potassium magnesium sulfate tetrahydrate, sodium bromide dihydrate, trisodium phosphate dodecahydrate, sodium carbonate decahydrate, sodium sesquicarbonate dihydrate, magnesium phosphate octahydrate, sodium metasilicate monohydrate, aluminum sulfate octadecahydrate, calcium nitrate tetrahydrate, calcium sulfate dihydrate, ferric phosphate tetrahydrate, lithium tetraborate pentahydrate, lithium nitrate trihydrate, lithium sulfate monohydrate, magnesium carbonate (basic) trihydrate, magnesium potassium sulfate hexahydrate, magnesium sodium chloride monohydrate, potassium tetraborate pentahydrate, potassium carbonate trihydrate, potassium pyrophosphate trihydrate, potassium tetrasilicate monohydrate, potassium sodium carbonate hexahydrate, sodium metaborate tetrahydrate, sodium tetraborate pentahydrate, sodium carbonate heptahydrate, sodium hypophosphate decahydrate, sodium phosphate (dibasic) heptahydrate, sodium phosphate (dibasic) dodecahydrate, sodium pyrophosphate decahydrate, sodium metasilicate nonahydrate, sodium sulfate heptahydrate, sodium sulfate decahydrate, and the like.

The hydrated inorganic salt is sufficiently soluble in water so that it will dissolve in aqueous solution when the calcium hypochlorite composition is employed in normal usage as a water-soluble sanitizing agent, such as in swimming pool treatment, waste water treatment, in cleaning of food handling and processing equipment, and the like, where there are used aqueous solutions having a concentration within the range of about 15 to 310 parts per million $Ca(OCl)_2$. In general, the solubility of the hydrated salt is at least about 50 – 100 grams per liter of water at 25°C.

The results of the invention in providing a safe, fire-resistant, decomposition-resistant calcium hypochlorite composition are illustrated by the following observations of ignition and external contaminant tests on representative compositions. A representative high-grade calcium hypochlorite composition is prepared using a well-known synthesis technique in which a mixture of hydrated lime and dibasic calcium hypochlorite is first chlorinated, the mixture is filtered, and sodium chloride is added to the clarified liquid with gentle mixing to precipitate neutral calcium hypochlorite dihydrate crystals. The slurry is centrifuged to separate the mother liquor containing dissolved salt. The wet cake, containing about 30 percent water, is then passed through a first stage dryer at about 180°F. where about half the water is volatilized (to about 18–20 percent level), and then passed through a second stage hot air dryer wherein the cake temperature ranges from 100°F. to 200°F. so that the calcium hypochlorite composition is taken to substantial dryness, i.e., a water content of 0 to less than 1 percent. The $Ca(OCl)_2$ content of the product is about 74 percent. In order to demonstrate the dangerous reactivity of this substantially dry calcium hypochlorite product, representative test samples (a test sample may consist of about 10 to 500 grams) are contacted with a lit match or burning cigarette (i.e., the "Ignition" test) resulting in immediate ignition and total destruction of the mass of material by self-propagation of the decomposition reaction; other test samples of this dry product are contacted with a drop of glycerine resulting in a delayed reaction of fire, fuming, carbonization, and propagation to complete destruction; other samples are contacted with a drop of 2-propanol plus ignition with a lit match or cigarette resulting in immediate reaction with blinding flame and propagation to total destruction with complete fusion of the mass.

Compositions in accordance with this invention are prepared by mixing the particulate ingredients uniformly in a roller mill, that is, measured amounts of the above described, potentially dangerous calcium hypochlorite with varying, measured amounts of representative, inorganic hydrated salts ranging from 5 to 20 percent by weight of the mixtures in 5 wt. percent increments. In marked contrast to the characteristics of the substantially anydrous calcium hypochlorite control composition described above, the mixtures containing the hydrated salt additive are unexpectedly stable to exothermic, self-propagating decomposition. In a series of stability tests as described above, these products are almost non-flammable to ignition by either lit match or burning cigarette and are much less ractive to organic contamination, such as addition of glycerol. The difference in reactivity is striking as noted by a delay in the time in which reaction begins, the reaction is less vigorous, and, most importantly, the reaction is essentially localized, without further propagation thereof, thus halting destruction of the mass of product in any material quantity. For example, the following concentrations of typical salts mixed with calcium hypochlorite provide compositions with reduced reactivity and good resistance to self-propagating decomposition.

| Hydrated salt additive | Wt. % hydrated salt in the calcium hypochlorite composition | Wt. % water (as supplied by salt) in calcium hypochlorite composition |
|---|---|---|
| Sodium Tetraborate · 5H$_2$O | 20 | 6.2 |
| Sodium Tetraborate · 8H$_2$O | 15 | 6.3 |
| Sodium Tetraborate · 10H$_2$O | 15 | 7.1 |
| Lithium Chloride · 1H$_2$O | 20 | 5.9 |
| Sodium Tripolyphosphate · 6H$_2$O | 20 | 4.5 |
| Magnesium Sulfate · 7H$_2$O | 10 | 5.1 |
| Potassium Magnesium Sulfate · 4H$_2$O | 20 | 3.8 |
| Sodium Bromide · 2H$_2$O | 20 | 5.2 |
| Trisodium Phosphate · 12H$_2$O | 15 | 8.7 |
| Sodium Carbonate · 10H$_2$O | 20 | 12.6 |
| Sodium Sesquicarbonate · 2H$_2$O | 20 | 3.2 |

A further advantage of the compositions embodied herein, in addition to the reduced fire hazards, is some supression of the dustry characteristics of the calcium hypochlorite compositions since the salt addition reduces the tendency of the dusty fines to become airborne and an irritant to people in the vicinity.

We claim:

1. A calcium hypochlorite composition resistant to exothermic, self-propagating decomposition when contacted by flame, spark or a contaminating organic substance consisting essentially of a uniform mixture of calcium hypochlorite and a water-soluble, hydrated inorganic salt selected from the group consisting of sodium tetraborate pentahydrate, sodium tetraborate octahydrate, sodium tetraborate decahydrate, lithium chloride monohydrate, sodium tripolyphosphate hexahydrate, magnesium sulfate heptahydrate, potassium magnesium sulfate tetrahydrate, sodium bromide dihydrate, trisodium phosphate dodecahydrate, sodium carbonate decahydrate, sodium sesquicarbonate dihydrate, magnesium phosphate octahydrate, sodium metasilicate monohydrate, aluminum sulfate octadecahydrate, calcium nitrate tetrahydrate, calcium sulfate dihydrate, ferric phosphate tetrahydrate, lithium tetraborate pentahydrate, lithium nitrate trihydrate, lithium sulfate monohydrate, magnesium carbonate (basic) trihydrate, magnesium potassium sulfate hexahydrate, magnesium sodium chloride monohydrate, potassium tetraborate pentahydrate, potassium carbonate trihydrate, potassium pyrophosphate trihydrate, potassium tetrasilicate monohydrate, potassium sodium carbonate hexahydrate, sodium metaborate tetrahydrate, sodium tetraborate pentahydrate, sodium carbonate heptahydrate, sodium hypophosphate decahydrate, sodium phosphate (dibasic) heptahydrate, sodium phosphate (dibasic) dodecahydrate, sodium pyrophosphate decahydrate, sodium metasilicate nonahydrate, sodium sulfate heptahydrate, and sodium sulfate decahydrate, in quantity sufficient to provide a water content in the mixture within the range of about 3 to about 13 percent by weight, said composition containing at least about 55 percent Ca(OCl)$_2$ by weight.

2. A composition in accordance with claim 1 which contains about 60 to 70 percent Ca(OCl)$_2$.

3. A composition in accordance with claim 1 in which the hydrated inorganic salt supplies from about 5 to 10 percent water, based on the weight of the mixture.

* * * * *